United States Patent
Steinich et al.

(10) Patent No.: US 8,274,275 B2
(45) Date of Patent: Sep. 25, 2012

(54) ANGLE SENSOR

(75) Inventors: Klaus Manfred Steinich, Zorneding (DE); Peter Wirth, Eching (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 945 days.

(21) Appl. No.: 12/231,553

(22) Filed: Sep. 4, 2008

(65) Prior Publication Data

US 2009/0079423 A1  Mar. 26, 2009

(30) Foreign Application Priority Data

Sep. 24, 2007  (DE) .......... 10 2007 045 535

(51) Int. Cl.
*G01B 7/30* (2006.01)
(52) U.S. Cl. .................................. 324/207.25
(58) Field of Classification Search .......... 324/207.25; 73/514.31, 514.39
See application file for complete search history.

(56) References Cited

U.S. PATENT DOCUMENTS

| 5,486,648 A * | 1/1996 | Chan et al. .............. 174/23 R |
| 7,893,578 B2 * | 2/2011 | Hayashi et al. ............ 310/68 B |
| 2005/0218884 A1 * | 10/2005 | Koike et al. ............... 324/174 |
| 2007/0057665 A1 * | 3/2007 | Borst et al. ............... 324/207.2 |
| 2009/0072816 A1 * | 3/2009 | Schrubbe et al. .......... 324/207.2 |

FOREIGN PATENT DOCUMENTS

JP  2006100609 A  *  4/2006

OTHER PUBLICATIONS

Abstract of JP 2006100609 A, Apr. 2006.*

* cited by examiner

*Primary Examiner* — Bot Ledynh
(74) *Attorney, Agent, or Firm* — Head, Johnson & Kachigian, P.C.

(57) ABSTRACT

The invention relates to an angle sensor which is only protected by an encasement body without having a surrounding protective housing.

33 Claims, 6 Drawing Sheets

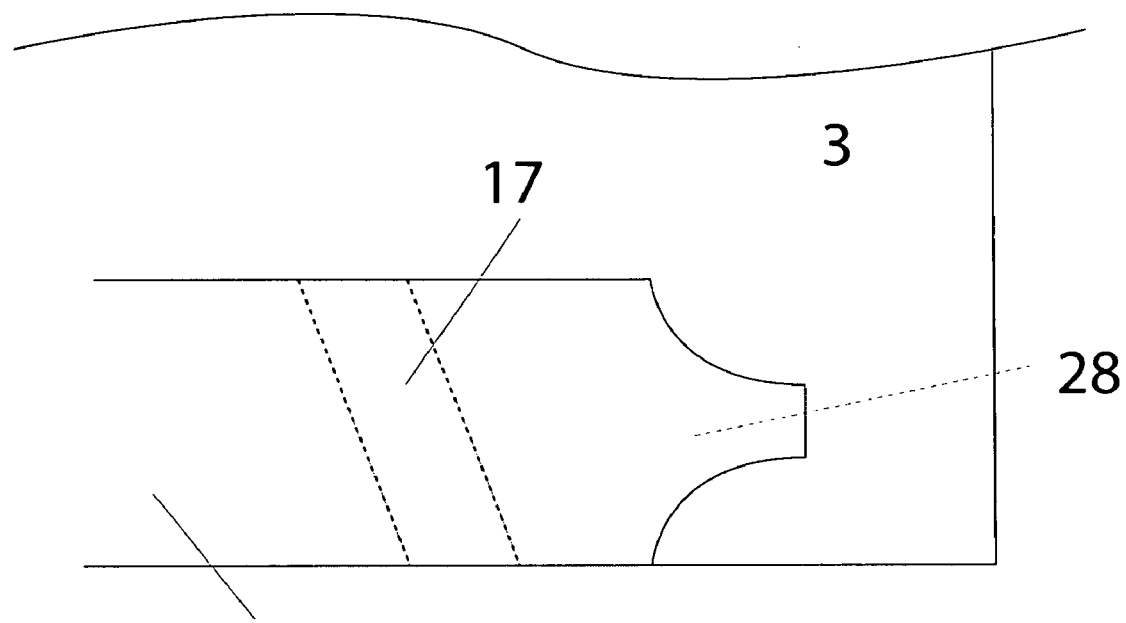

ANGLE SENSOR

CROSS-REFERENCE TO RELATED APPLICATIONS

This U.S. application claims priority to German Application No. 10 2007 045 535.8 filed 24 Sep. 2007 which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

I. Field of the Invention

The invention relates to an angle sensor which reacts to a magnetic encoder.

II. Technical Background

In such angle sensors, the rotation angle transmission between the encoder, thus the magnet, and the sensor element in the angle sensor, which is typically configured in the form of an electronic chip (IC), is exclusively performed by magnetic field lines and, in particular, without mechanical coupling, so that the sensor element and, in particular the entire angle sensor, can be completely encased and disposed in a space of its own, as long as it is thus assured that the magnetic field of the encoder magnet can penetrate into the space up to the sensor element.

For sensor elements, elements are being used which operate according to the "Hall-principle" or according to the magneto-resistive principle.

In the state-of-the art angle sensors are known in which the sensor element in the form of an IC and additional electrical components used for processing the signals of the IC are jointly disposed on a circuit board, and the entire circuit is disposed in a surrounding housing.

Depending on the application, thus prevailing environmental conditions, different partially contrarian objectives have to be accomplished.

On one hand, the housing shall be configured as mechanically stable as possible and therefore shall be made of metal.

On the other hand, the housing has to be shielded against interference effects from magnetic fields which do not originate from the encoder magnet, wherein a magnetic shielding made of iron is preferred.

The angle sensor shall be produce in the most cost effective manner and, thus, shall be configured as simple as possible.

Furthermore, the electronics have to be protected against the penetration of moisture, which would always lead to a defect of the sensor element medium term. Thus, the greatest risk does not come from a surge of moisture but from moisture slowly penetrating due to capillary effects e.g. through the strands of the cables connected to the electronics and leading to the outside, the so called "longitudinal water".

With respect to these conflicting requirements, there are currently two different embodiments available on the market:

On the one hand, there are angle sensors in which the entire electronics are mechanically well protected in a mostly pot-shaped metal housing and well protected against penetrating moisture. However, the metal housing and its sealing cause manufacturing complexity and, thus, high cost.

On the other hand, there are angle sensors in which the electronics are directly mounted to the circuit board which is bolted down at the place of installation. The electronics are only protected by a plastic cap in a basic manner against mechanical damage and are not sealed against moisture at all.

SUMMARY OF THE INVENTION

Thus, it is the object of the present invention to provide an angle sensor, as well as a method for producing the angle sensor, wherein the angle sensor can be produced in a simple and cost effective manner, while providing adequate protection against mechanical damage, as well as protection against penetration of moisture, without having to resort to a complex separate housing.

Since the electronic circuit of the angle sensor, including the sensor element on the carrier board, is completely surrounded by an encasement body and the circuit does not have a surrounding housing, besides the mostly only one-sided carrier body which is normally only a carrier board for mounting to the vicinity, production is very cost effective because no production cost is incurred for a housing surrounding the shaped body.

Even the mounting of the circuit board to the carrier body or to the carrier board, in case these are separate components, can be performed by using the encasement body and, thus, can be performed in the same step in which the circuit is encased.

Nevertheless, the encasement body provides adequate sealing against penetration of contaminants and moisture, and, furthermore, provides adequate mechanical protection for the circuit of the angle sensor and for the sensor element itself, since the encasement body is made of hardened encasement compound which is sufficiently stable in hardened state, which can be accomplished by a two layered encasement with an outer hard layer.

While the encasement body adhering to the particular circuit board reliably prevents the penetration of moisture between the encasement body and the circuit board, the penetration of moisture through the cable leading to the angle sensor has to be separately prevented by a longitudinal water barrier in the cable inlet, which is preferably also disposed inside the encasement body and can be implemented using the encasement body.

A longitudinal water barrier of this type is implemented by preventing the capillary conduction to the circuit between the strand wires of a strand by stripping the strand of its insulation and tinning it over an adequate length, whereby the soldering tin also penetrates into the gaps between the individual strand wires, which creates a solid cross section.

In the longitudinal gap between the lead insulation and the strand wires, water can creep forward. However, the water cannot penetrate further towards the circuit where it exits at the end of the lead insulation, in case this end is either still located outside the encasement body, which however is not permissible in order to protect the strands, which are then bare, against contact, or the end is encased in the encasement body, thus no additional capillary paths for the water are provided.

The same also applies to water creeping forward between the cable jacket and the particular lead insulations.

In order to provide a reliable adhesion of the encasement body at the particular board, in particular at the circuit board and thus to provide tightness against moisture, it is furthermore provided that the board is not coated with metal or any other barely adhering material at least in a circumferentially enclosed, in particular circular ring, portion about the circuit, but that the ring portion is not treated and may even comprise an additionally roughened surface of the plastic of the circuit board. The ring portion is also covered by the encasement body. At this surface portion a very strong adhesion or connection of the encasement body occurs with the material of the circuit board which prevents moisture from creeping to the circuit.

This is further improved when a groove is fabricated in the ring portion which surrounds the circuit in an annular manner, which, on the one hand, improves adhesion of the material of the encasement body, and furthermore, extends the potential radial creeping path of moisture to the circuit.

These measures are useful because a continuously tight adhesion at the encasement body is much more difficult to reach at the location where the encasement body contacts the metalized surface of the circuit board, due to the smooth surface of the metalized surfaces.

The encasement body should, furthermore, be attached mechanically sufficiently tight to the particular board so it will not disconnect easily in the event of impacts, vibrations, or similar circumstances. An additional form-locked mounting of the encasement body at the circuit board is used for this purpose.

When the circuit board and the carrier body, in particular the carrier board, are separate elements, this will be achieved by the encasement body surrounding the circuit board with the circuit on all sides and additionally contacting the upper side of the carrier body, in particular the upper side of the carrier board, and adhering to it. On the one hand, an additional mechanical connection between the circuit board and the carrier board, like e.g. a bolted connection, can possibly be completely dispensed with, on the other hand, reaching around the circuit board also causes mechanical interlocking. In these cases the carrier board will preferably be comprised of metal.

However, when the carrier board simultaneously forms the circuit board, it is typically made of a core made of non-conductive plastic, e.g. glass fiber reinforced plastic, which is coated at least on the upper side with conductive metal, typically with copper, for forming a circuit board. Additionally, the copper layer is coated or galvanized with a more corrosion resistant metal layer made of zinc, silver or gold, and this is preferably not only done in the portions where it has to provide conductive paths for the circuit but also in the entire portion located outside of the encasement body of the combined carrier/circuit board, thus on the upper side, on the bottom side, on the narrow sides, and even on the interior flanks of the mounting bore holes in order to prevent moisture from penetrating into the plastic material of the board.

In order to provide a form locked connection with the combined carrier/circuit board, the encasement body reaches around portions of the exterior circumference of the board on the narrow sides. The narrow sides are preferably provided in an enveloped portion with a cross section which is curved outward in a convex manner whose highest point is enveloped by the encasement body e.g. by the encasement body sitting on the upper side, reaching over the narrow side portions into the bottom side.

Additionally, and/or in a supplemental manner, anchor bore holes are provided in the combined carrier/circuit board which reach through the board from the upper side to the bottom side, and into which the encasement body reaches, and which the encasement body fills completely. In particular, when these anchor bore holes are not provided in parallel to the transversal direction of the plane of the board but at an angle to the plane or when they expand toward a side facing away from the encasement body, the encasement body is held in a form locked manner.

The ring portion, which is not metal coated and is used for improving the adhesion of the encasement body, is simultaneously used as a lock. Through the ring portion and beyond, stripped and tinned strands, e.g. of the electric supply leads, are encased in the encasement body, and thus preferably curved through the ring portion in order to increase the potential creeping distance.

The tinned strand or the solid wire, which leads in a radial direction beyond the non-coated rim portion of the circuit board, can be the strand wire of the supply cable or a separate strand. Preferably, however, when using the strand wire of the supply leads or the supply cable, an additional soldering is performed outside of the ring portion of the circuit board which facilitates additional pull relief. The solder point is also encased by the encasement body and adheres to it in a tight manner and adheres to all elements of the circuit and to all contact surfaces of the circuit board in a tight manner, since it is encased by the encasement compound while it is in a sticky state.

The stripped portions of the strand wire of the supply cable can preferably be prevented from establishing mutual contact during encasement by non-conductive plastic spacers.

Since the sensor element of the sensor reacts to magnetic field lines, interfering magnetic fields besides those of the encoder magnet are possibly prevented from penetrating to the sensor element, which preferably provides a magnetic shielding of the angle sensor. For this purpose, either the carrier board itself is made of a magnetically conductive material or it comprises such layer, or a separate board made of such magnetically conductive material, like e.g. soft iron, ferrite or nickel, is disposed on its backside.

The shielding board, seen in a top view, covers at least the portion of the circuit of the angle sensor including the sensor element.

For mechanical mounting, the shielding board preferably has threaded rim holes which fit into the mounting bore holes of the carrier board, which are located therein outside of the encasement body and which are preferably provided as slotted holes extending in an arc about the sensor element.

Since the threaded rim holes have a length which corresponds at least to the thickness of the carrier board, the mounting bolts then contact the threaded rim holes and not the carrier board, which prevents the metal coating of the carrier board from being damaged by tightening the mounting bolts.

Since the threaded rim holes are not configured as slotted holes, they can be moved and positioned along the slotted holes in the carrier board without laterally protruding beyond the carrier board in top view.

For an even better magnetic shielding, also from the front, the encasement body can be configured in several layers, with an inner layer which is connected to the circuit and with an outer layer which is magnetically conductive through additive materials, or through a received solid body, and which is, in particular, in contact with the coating of the carrier board or the of the carrier/circuit board outside of the non-coated ring portion, and also magnetically shields the sensor element from the front. Only in the very portion above the sensor element, the shielding does not exist, in particular, the second layer of the encasement body does not exist.

A two-layer encasement can also be used to leave the inner layer of the encasement elastic also in hardened state, thereby minimizing stress relative to the components of the circuit, e.g. due to temperature expansion.

Such magnetic shielding should have a high permeability μ of at least 100, better at least 1000, or even better at least 50,000, and shall be disposed as close to the sensor element as possible, in particular closer than 6 mm. The material, by which the shielding is effectuated, shall have a coercive field strength Hc of less than 5 A/cm, better less than 0.5 A/cm, better less than 0.05 A/cm, and can also be comprised of plastic bound ferrite, hard ferrite, or nano-crystalline iron. In a multilayer configuration of the shielding, one layer can have a particularly high permeability and the other layer can have a particularly low remanence.

The angle sensor according to the invention is preferably configured flat or board shaped. The sensor element, which is typically configured as a chip, is disposed in parallel to the main plane of the board shaped angle sensor, preferably on the front face of a circuit board, disposed in parallel with the main plane of the sensor. Besides the sensor element, the circuit board also carries the processing electronics for the signals of the sensor element and, in particular, a transmitter for wireless transmission of the signals of the processing electronics to the ambient.

Preferably, the processing electronics are still programmable in completely assembled state, in particular, either through an additional electrical conductor in the cable or also wirelessly by radio signals or optical signals, or by programming through the existing electrical supply conductors by transitioning into a programming mode. Since the encasement body is made from transparent material and the circuit comprises, in particular, light emitting diodes and other optically recognizable and switchable elements, the functioning of the angle sensor and possibly also its programming state can be sensed any time.

Such angle sensor is being manufactured by advantageously producing it in parallel with many other angle sensors until it is functional and tested.

The encasement is then performed either for each particular sensor after separating the particular angle sensors from the plurality or for several angle sensors, which are still connected among one another, either for the whole plurality or for a portion of the plurality, e.g. a strip of adjacent circuit boards of angle sensors, which are still connected amongst one another, which reduces the time necessary for encasement, however, then the subsequent separation spots of the circuit boards cannot be encased through molding simultaneously.

In order to subsequently facilitate the alignment of the indicator magnet with the sensor element in the angle sensor, a marker for the center of the sensor can be disposed on the upper side of the encasement body, in particular, in the form of an indentation or of a protrusion at the encasement body. Preferably, also the encoder magnet itself has such a marker.

For assembly, the encoder magnet and the sensor element shall be brought as close together as possible, but they shall not touch one another. For this reason, a marker in the form of a protrusion is preferably removably configured either on the side of the encoder magnet or of the angle sensor, e.g. removable from the respective carrier component.

BRIEF DESCRIPTION OF THE DRAWINGS

Embodiments of the invention are subsequently described in more detail in an exemplary manner.

FIGS. 1a through 1c show a first embodiment of the angle sensor.

DETAILED DESCRIPTION OF THE INVENTION

Figure 1A:
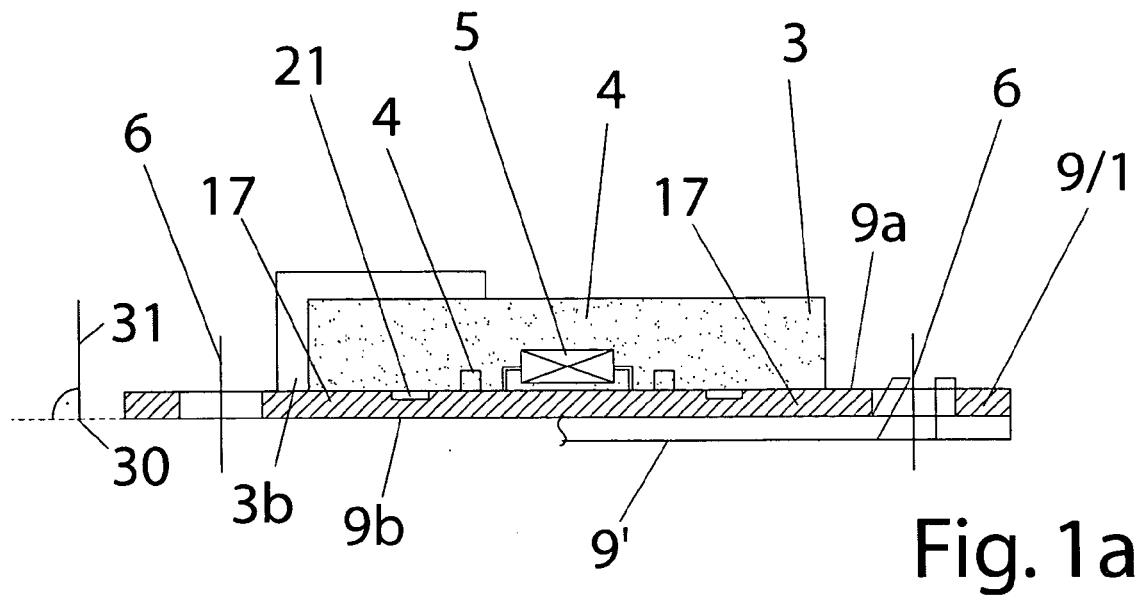
Figure 1B:
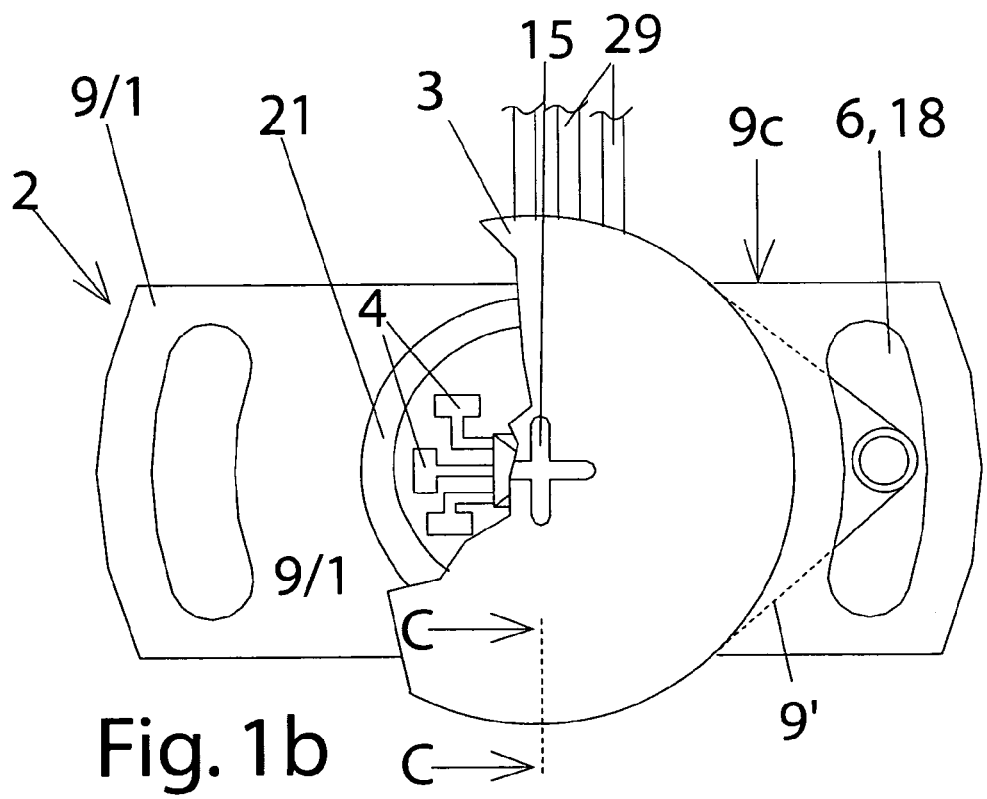

In FIGS. 1a, 1b and 1c, a carrier board 9 used for mechanical stability and for connecting to a component in the vicinity simultaneously forms a circuit board 1 so that, in this case, a combined carrier board and circuit board 9/1 can be referred to.

The combined carrier board and circuit board 9/1 is comprised of a mechanically stable, electrically non-conductive core, like e.g. glass fiber reinforced plastic (GRP), and is mostly coated in an electrically conductive manner on its exterior surface, mostly copper plated. The layer is, in turn, covered by a corrosion protection layer (galvanized zinc or gold layer), which is not illustrated in the drawings.

An upper side 9a of the combined board 9/1, which is also partially coated in this manner, is then used as a circuit board 1.

For this purpose, a portion of upper side 9a, where components 4 are to be mounted onto circuit board 1 to implement the electrical circuit, is only provided with coating in the form of conductive paths and solder joints according to the previously configured design of the circuit. This portion of the circuit is surrounded by a circumferential annular portion 21 which is closed in ring shape on upper side 9a and in which no electrically conductive coating is provided on the core made of non-conductive plastic.

Annular portion 21 is used for electrically insulating the portion of the circuit serving as circuit board 1 from the rest of the electrically conductive coating located outside of the portion of the circuit.

Outside of the non-coated ring portion 21', the combined board 9/1 protrudes in a radial direction, in this case, in two directions opposite to one another in order to be able to be mounted to a component in the vicinity, in the present case, by mounting bore holes 6 which are provided as slotted holes 18, which are configured arc shaped about the center of combined board 9/1. The slotted holes reach through combined board 9/1.

FIG. 1a illustrates how components 4 of the circuit and among others sensor element 5 in the form of an IC, are mounted on upper side 9a and connected in an electrically conductive manner to conductive paths in the portion of the circuit on upper side 9a.

The circuit on upper side 9a is furthermore protected against penetration of moisture and dust, as well as against mechanical damages, through encasement with an encasement compound hardening in the encasement mold. The encasement compound subsequently forms an encasement body 3. Encasement body 3 encases the entire circuit, thus all components 4 including the sensor element 5 of the circuit, and contacts upper surface 9a of combined board 9/1 in a tight manner, wherein it covers the portion of the circuit and also covers a ring portion 21' which is not coated in an electrically conductive manner, and preferably also covers the portion disposed outside of the ring portion 21 which is coated in an electrically conductive manner.

Since the encasement material does not adhere very well to the electrically conductive coating, it is provided to achieve a form locked connection of encasement body 3 with combined board 9/1, in particular, with its non-conductive core, also beyond the friction locked connection to the non-coated ring portion 21. This is facilitated in the present case by a combination of two measures.

On the one hand, anchoring bore holes 17, which reach through board 9/1, are disposed within the portion covered by encasement body 3, preferably within the non-coated ring portion 21. The interior circumferential surfaces of bore holes 6 are preferably also not coated with metal so that the encasement material can interlock in the relatively rough walls of the bore holes. The non-coated surface 9a, e.g. in the ring portion 21', is relatively rough. There, however, the unevenness does not yield friction-locking in liftoff direction, thus, transversal to board plane 30.

Above all, a friction locking is accomplished in mounting bore holes 6 by these bore holes either expanding cone shaped toward lower side 9b of board 9/1, as shown in the left half of FIG. 1a, or extending at a slant angle to the transversal direction 31 with reference to the board plane 30, as illustrated in the right half of the depiction.

Since the bore holes are preferably filled with encasement material up to bottom side 9b, there is a form locked adhesion in mounting bore holes 6.

Furthermore, encasement body 3, as illustrated in detail in cross section in FIG. 1c, encloses a portion of narrow sides 9c of combined board 9/1, which has approximately a rectangular shape in this case.

Since encasement body 3, seen in top view, has a round shape whose diameter is greater than the width of board 9/1, the centrally disposed encasement body 3 laterally protrudes beyond board 9/1, and since it extends in elevation, thus viewed in transversal direction 31, to lower side 9b of the encased board 9/1, it reaches around narrow side 9c in the center portion of the long narrow side.

However, in this location narrow side 9c is not electrically conductive and metal coated like the remaining narrow sides, but it does not have a coating. Additionally, narrow side 9c has a convex curvature to the outside, in this case provided as a bar 28.

This occurs e.g. because during the manufacture of the particular boards in the narrow side portion, the particular boards 9/1 were still connected amongst one another and are only separated in this location by a knife or a cutter after the contour 9/1 and its electrically conductive coating, e.g. by incision on both sides and subsequent breaking, which creates bar 28.

Thus, bar 28 is enveloped by encasement body 3 in a form-locked manner from the top to the bottom on the outside and, additionally, encasement body 3 adheres very well in a friction locked manner at the non-coated surface of the bar.

Since sensor element 5 shall react to magnetic fields which are expected from an opposite encoder magnet (which is only illustrated in FIG. 5), the sensor element shall be shielded in cases where there are also interfering magnetic fields against the interfering magnetic fields by a magnetically conductive material.

In the embodiment of FIGS. 1a, 1b and 1c, this can be achieved in a simple manner by placing a shielding board 9' made of such magnetically conductive material under before bolting down angle sensor 2, wherein the shielding board covers at least the portion of sensor element 5, better of the entire circuit, and extends for the purpose of simpler bolting down also into the portion of mounting bore holes 6, which are provided as slotted holes 18 in this case.

While combined board 9/1 is substantially rectangular and protrudes beyond the round encasement body 3 onto opposite sides with the entire width, shielding board 9' preferably comprises two protrusions which only taper to a point in diametrical direction in the two directions of encasement body 3, in whose tips the rim hole for bolting down is disposed. The rim hole is preferably provided as threaded rim hole with an axial length which is equal to or greater than the thickness of combined board 9/1 and with such diameter that the threaded rim hole fits into mounting bore hole 6 or into slotted hole 18.

Bolting down the angle sensor at a component in the vicinity can thus independently, from at which location of slotted hole 18 the bolting is performed, always be performed through the respective mounting bore hole and the threaded rim hole of shielding board 9', since it can be pivoted within slotted hole 18 without protruding beyond the exterior dimensions of combined board 9/1.

FIG. 1a furthermore shows the multilayer production of encasement body 3 as an option, since it comprises a layer 3b in the left portion of FIG. 1a of the layer 3a, which is electrically non-conductive, layer 3b also contacts on upper side 9a of combined board 9/1, which is conductive overall through additives or through receiving a foreign object in its interior, which are comprised respectively of magnetically conductive material, and thus yield a shielding of sensor element 5 on its topside wherein the portion directly above sensor element 5 certainly must not be magnetically covered, and layer 3b of encasement body 3 should not be present in the location.

Thus, a magnetic shielding of sensor element 5 can be accomplished on almost all sides, besides the narrow sides of combined board 9/1, which, however, are so small that a penetration of interfering magnetic fields in this location is extremely unlikely.

In order to further improve the adhesion of the encasement body in the non-coated ring portion 21', ring portion 12' can be configured as a groove with increased depth or such a groove 21 can be disposed within the non-coated ring portion 21'. Besides the better adhesion through the rough surface of groove 21, the potential creeping distance which the moisture has to cover is extended in radial direction from outside of the ring portion 21' towards the interior of the ring portion 21' by groove 21, which gives the groove the ability to interrupt the capillaries.

Figure 2A:
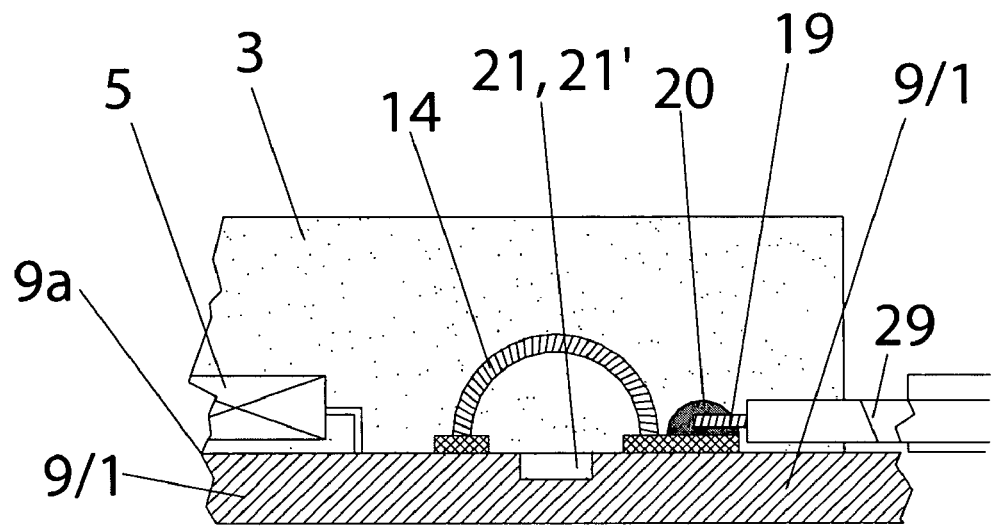
FIGS. 2a and 2b show a detailed illustration of the longitudinal water barrier.
Figure 2B:
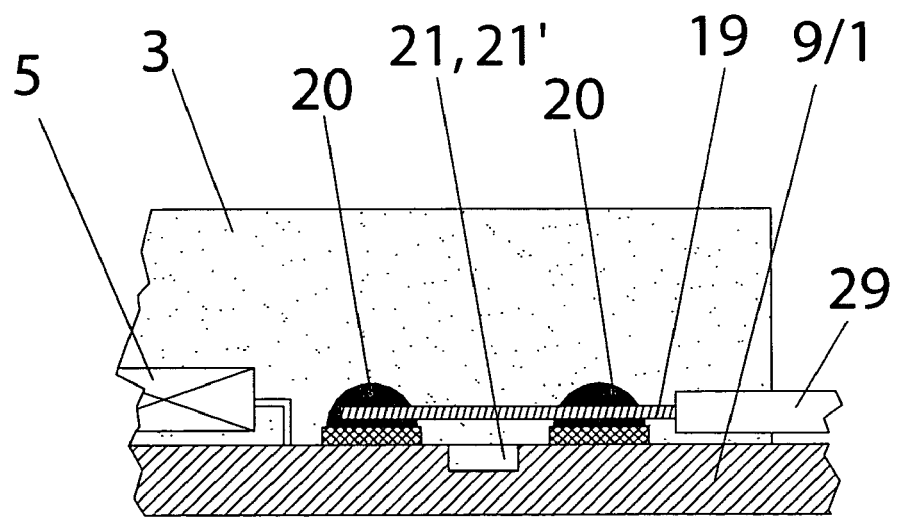

In FIG. 1b, furthermore, the electrically insulated leads 29 are illustrated which lead to the electrical circuit and which are better visible in the enlarged sectional view in the detailed illustrations of FIGS. 2a and 2b, including the longitudinal water block, visible in the location.

The same capillary interrupting effect is intended by the specific configuration of the electrical connection of the circuit within ring portion 21' with the cable run in from the exterior of the ring portion or with its leads 29ab.

It is important in this context that the electrically non-conductive ring portion 21 or groove 21' are bridged in radial direction in an electrically conductive manner by an electrically conductive solid wire 14 or a strand, reaching around each electrical lead 29ab, starting with the ring portion, wherein in case a strand is used, the strand is completely tinned.

By tinning, a circumferentially closed surface of the strand is accomplished, and through the penetration of the liquid soldering tin into the interior of the strand between the particular strand wires, also the cross section is closed internally, and does not provide any cavities extending in longitudinal direction for the penetration of the so-called longitudinal water.

The wire or strand 14 is fixed inside and outside of ring portion 21' at soldering joints 20 on upper side 9a, thus of circuit board 1, and extends at a distance above upper side 9a, and is therefore also completely enclosed by encasement body 3 in the portion between the ends. Through the adhesion of the encasement body, neither along the surface of the wire or of strand 14 moisture can penetrate nor in the interior of the strand due to the soldering tin of the closed cavities, or due to the lack of existence of such cavities in case of a solid wire.

In order to additionally enlarge the potential creeping distance for moisture also in this case, the wire or strand 14 is preferably mounted in an arc, so it curves away from upper side 9a, as illustrated in FIG. 2a. While FIG. 2a shows a separate piece of strand 14, the extended stripped end of the strand 19 of the run-in lead 29 can be also used. However, strand 19 is still soldered outside of ring portion 21' on circuit board 1.

In order to also stop penetration of longitudinal water either between strand 19 and lead insulation 29, the insulation of lead 29 preferably already ends within encasement body 3. However, if it were to end outside of encasement body 3, longitudinal water exiting at this location would not reach the circuit either, however, strand 19, which is stripped of its insulation, would not be shielded outside of encasement body 3.

The same applies when the particular leads 29ab are bundled into a cable, for the jacket of the cable which is not shown.

Figure 3:
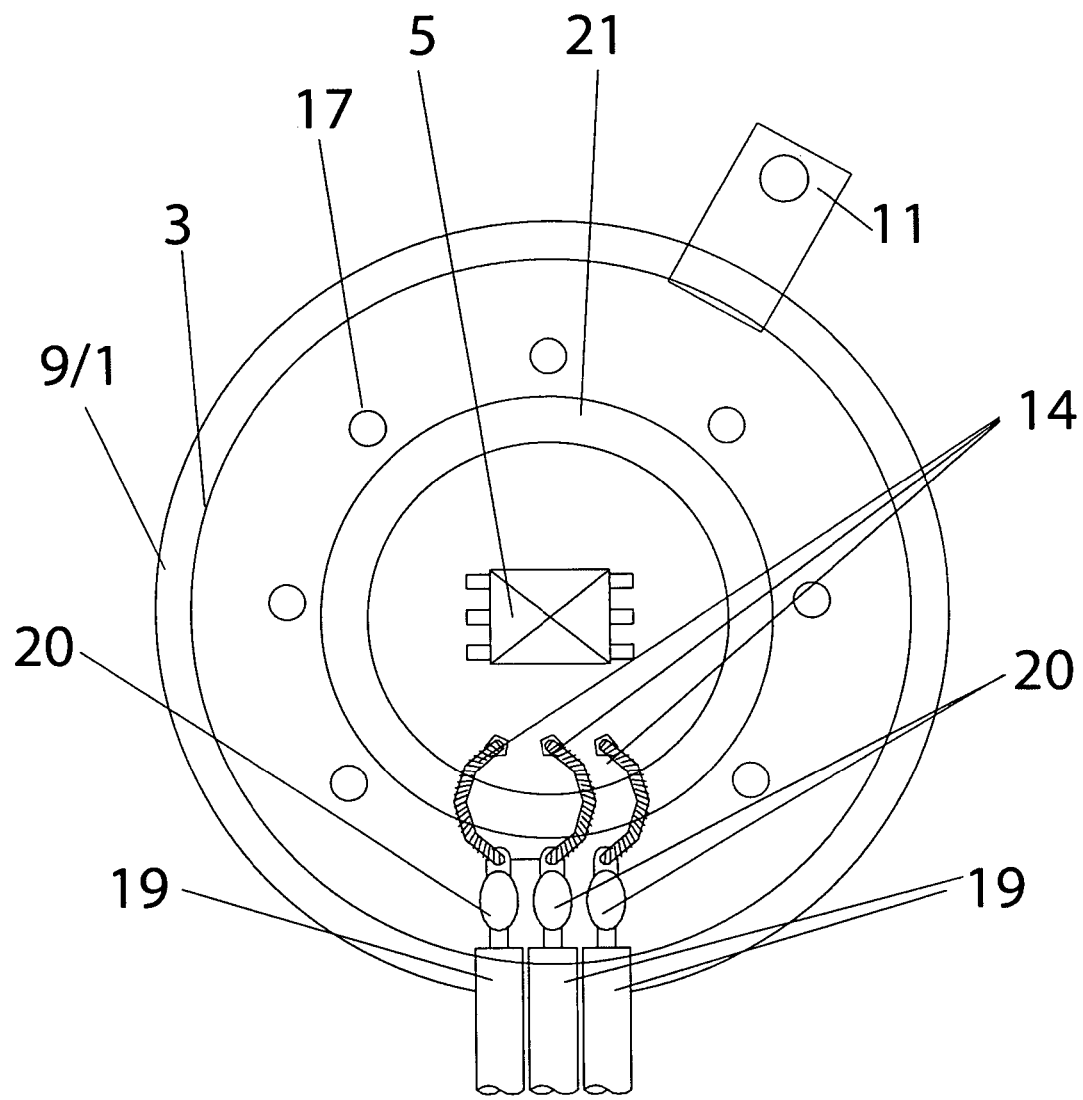
FIG. 3 shows an embodiment without a mounting bore hole.

FIG. 3 shows an embodiment which differs from the embodiment of FIG. 1 only with respect to the mounting of combined board 9/1 in the vicinity.

The combined board 9/1 protrudes in this case on all sides beyond the encasement body 3 and can thus be bolted in any location, e.g. by indicated clamping shoes 11, to a component in the vicinity.

Figure 4A:
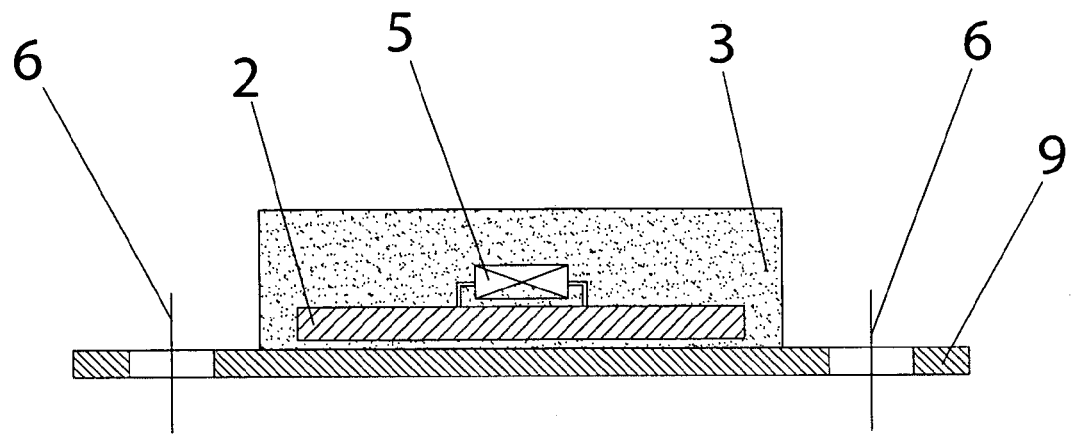
FIGS. 4a and 4b show an embodiment with a separate circuit board 1.

FIG. 4a shows an embodiment in a sectional view, which is similar to FIG. 1a, wherein the difference to FIG. 1a is that the circuit board 1 and the carrier board 9 are separate components in this case.

A carrier board 9, preferably a metal carrier board, is selected. The circuit board 1 is a typical circuit board material made of a non-conductive plastic with an electrically conductive selectively applied coating, which is at least applied on one side. On the upper side of the circuit board, facing away from carrier board 9, the circuit is constructed by sensor element 5 and additional electronic components 4.

Figure 4B:
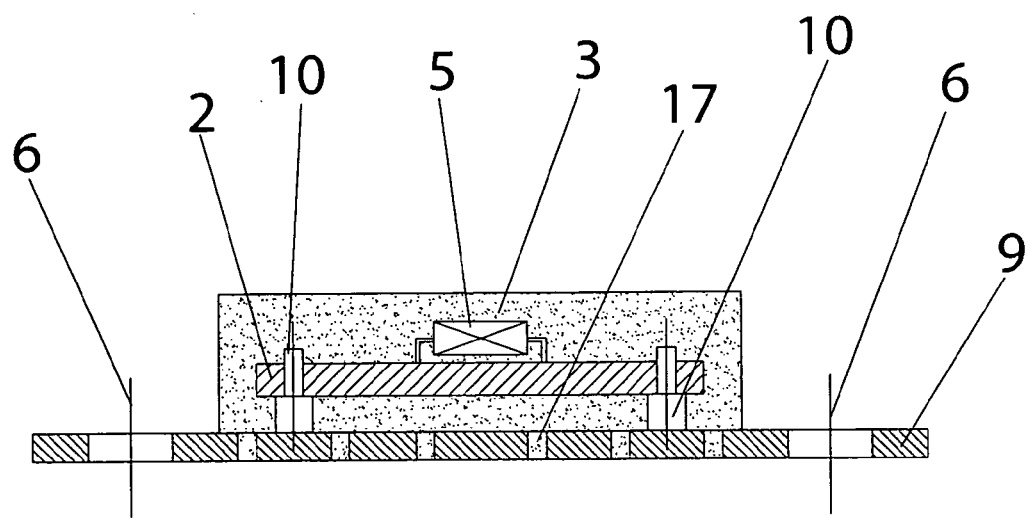

Thus, the entire circuit board 1, including the circuit constructed thereon, is enclosed tight by encasement body 3 besides leads 29, leading into encasement body 3, electrical cables or spacer elements 10, which mechanically fix circuit board 1 at carrier board 9, e.g. by a bolted connection illustrated in FIG. 4b.

To the contrary, FIG. 4a features a mechanical connection between the circuit board 1 and carrier board 9 only by positioning carrier board 9 during encasement by encasement body 3, and encasement body 3 thus being friction locked to carrier board 9, and possibly additionally being mounted to carrier board 9 by the described anchoring bore holes 17, and/or by the form locked overreaching of portion of the narrow sides of carrier board 9, which can be provided in the solution according to FIG. 4, separately, or in combination.

Figure 5A:
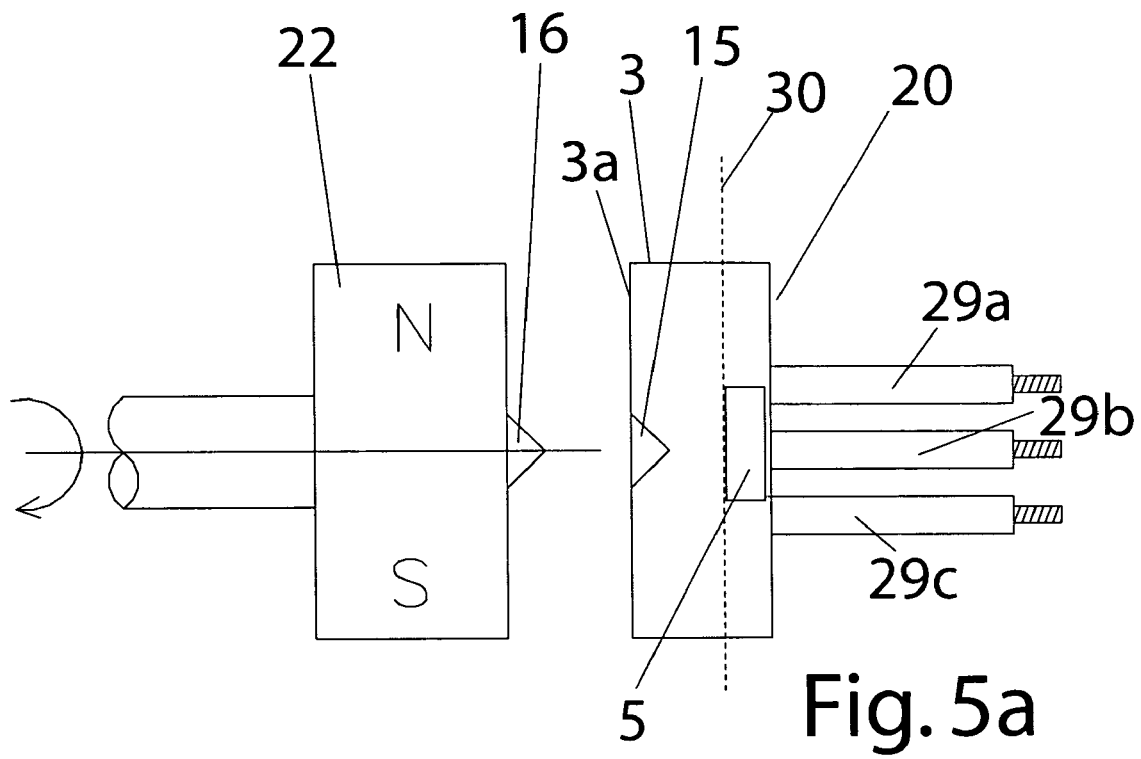
FIGS. 5a and 5b illustrate the angle sensor together with an encoder magnet 22.
Figure 5B:
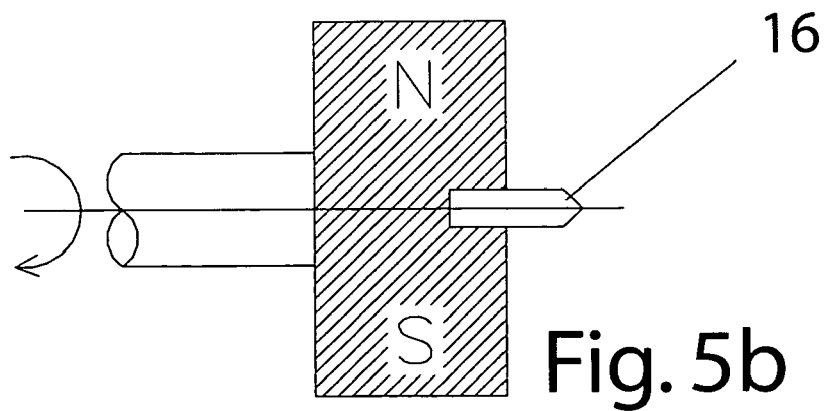

FIG. 5 shows angle sensor 2, viewed in board plane 30, together with encoder magnet 22, opposite to sensor 2. The function of the angle sensor is thus the more exact, the more precise the center of encoder magnet 22, whose pole connection line should be as parallel as possible to board plane 30, is aligned with sensor element 5 in angle sensor 2.

In order to facilitate this, when mounting encoder magnet 22, encasement body 3 of angle sensor 2 comprises a marker 15 at its upper side 3a above angle sensor 5, wherein the marker indicates the position of sensor element 5, and to which the center of encoder magnet 22 can then easily be aligned. In this case the marker 15 is an indentation.

Additionally, the encoder magnet can comprise a marker 16 between the poles for the center of the encoder magnet, wherein the marker is preferably provided as a protrusion or vice versa. However, during the operation of the sensor unit, no touching of encoder magnet 22 and angle sensor 2 is provided. The marker configured as protrusion, in this case the marker 16 for the center of the magnet, should be removable after assembly, in order to reliably avoid such contact.

What is claimed is:

1. An angle sensor (2), said sensor comprising:
  a magnetically sensitive face portion, which operates according to the Hall-principle or according to the magneto resistive principle, comprising a sensor element (5) proximal to its front face;
  a carrier board (9) used for mounting to a vicinity;
  an electric circuit, mounted to a circuit board (1), completely enclosed by a hardened encasement body;
  the encasement body mounted to the circuit board (1) in a form-locked manner and through adhesion;
  and wherein said carrier board simultaneously forms said circuit board to form a combined carrier board and circuit board and wherein said combined carrier board and circuit board is made from the group consisting of: plastic, fiber reinforced plastic, glass fiber reinforced epoxy (GRP), and partially comprises a metal coating which is electrically conductive;
  the metal coating comprises all portions of the carrier board and circuit board (9/1) which are not covered by said encasement body (3), including all narrow sides (9c) of said carrier board (9/1); and
  the metal coating is only provided on a surface portion of an upper side (9a), which is covered by said encasement body (3), where the coating is required for an electrical conductor path.

2. The angle sensor (2) according to claim 1 wherein a longitudinal water barrier is provided in a cable in feed within said encasement body.

3. The angle sensor (2) according to claim 1 wherein said circuit board (1) is mounted at a distance from said carrier board (9) and said encasement body (3) encloses said circuit board (1) on all sides.

4. The angle sensor (2) according to claim 1 wherein said carrier board (9) is comprised of sheet metal.

5. The angle sensor (2) according to claim 1 wherein said carrier board (9) simultaneously forms said circuit board (1) to form a combined carrier board and circuit board, and said encasement body contacts an upper side (9a) of said circuit board (1), which carries the circuit, so that the entire circuit is covered and said encasement body (3) encloses contour portions of the combined carrier board and circuit board which comprise a contour which changes in transversal direction (31) of a board plane (30).

6. The angle sensor (2) according to claim 1 wherein said encasement body (3) reaches into anchor bore holes (17) and fills them, wherein said bore holes extend at a slant angle to a transversal direction (31), or conically expand towards a backside (9b) of said carrier board (9).

7. The angle sensor (2) according to claim 1 wherein said encasement body (3) reaches around portions of said carrier board and circuit board on narrow sides (9c), and the narrow sides comprise a cross section contour in this portion, which is curved in a convex manner to an outside from a transversal direction (31).

8. The angle sensor (2) according to claim 1 wherein a portion, which is as large as possible, of an upper side (9a) of said carrier board (9), which is covered by said encasement body (3), is an untreated, roughened upper side of plastic of said carrier board (9).

9. The angle sensor (2) according to claim 1 wherein a portion of an upper side (9a) of said carrier board, which is covered by said encasement body (3) and not coated by metal, extends about the circuit in a closed annular manner, and a groove is fabricated in the upper side (9a) in a ring portion (21), wherein a groove has a capillary interrupting effect and is also closed in an annular manner, wherein said encasement body (3) also fills said groove, anchor bore holes are disposed outside of the ring portions.

10. The angle sensor (2) according to claim 5 wherein portions of said carrier/circuit board (9/1), which are metal coated in an electrically conductive manner, are covered by a minimally corroding layer selected from the group consisting of: metal, galvanic, zinc and gold.

11. The angle sensor (2) according to claim 1 wherein said carrier board (9) is comprised of a magnetically conductive material, or a combined carrier board and circuit board comprises a layer of magnetically conductive material on its backside, either as a coating or as a separate board.

12. The angle sensor (2) according to claim 11 wherein the carrier board is a magnetically conductive shielding board (9') having threaded rim holes for bolting to the floor.

13. The angle sensor (2) according to claim 1 wherein said carrier board (9) or a combined carrier/circuit board (9/1) comprises mounting bore holes (6) in portions not covered by said encasement body (3), which are configured as slotted holes (18), for bolting to a component in the vicinity, and threaded rim holes of a shielding board (9') are positioned so that they fit into the mounting bore holes (6).

14. The angle sensor (2) according to claim 11 wherein said shielding board (9') covers a portion of said circuit in a portion covered by said encasement body (3), and threaded rim holes are located outside of a portion of said encasement body (3).

15. The angle sensor (2) according to claim 1 wherein said combined carrier board and circuit board protrudes on all sides beyond a portion covered by said encasement body (3) to mount to a component in the vicinity by clamping shoes.

16. The angle sensor (2) according to claim 1 wherein a jacket of a cable connected to the circuit, and/or lead insulations of the leads of a cable connected to a circuit, end within said encasement body (3), however, outside of the portion which surrounds the circuit in an annular manner and which is not coated by metal in a conductive manner; and
  a ring portion (21') is bridged in an electrically conductive manner by a strand (19) of the lead or of the cable to the circuit by a solid wire or a tinned strand (14), bridging said ring portion (21') in radial direction.

17. The angle sensor (2) according to claim 16 wherein said bridging wire or strand (14) is an end of said strand wire (19) where an insulation is stripped.

18. The angle sensor (2) according to claim 16 wherein said wire or strand (14) bridging said ring portion (21') curves in an arc away from an upper surface (9a) of said carrier board (9), or of the combined carrier/circuit board (9/1), into said encasement body (3), and is configured as long as possible.

19. The angle sensor (2) according to claim 16 wherein when using said strand wire (19) as bridging wire/strand (14), said strand (19) is soldered to said circuit board (1) or (9/1), also outside of said ring portion (21') as a pull-relief.

20. The angle sensor (2) according to claim 16 wherein said portions of said strand wire (19), where said insulation is stripped, are prevented from contacting one another by non-conductive spacers during molding of said encasement body (3).

21. The angle sensor (2) according to claim 1 wherein said encasement body (3) is configured in several layers with an inner layer (3a), which is connected to said circuit, and an outer layer (3b), which is magnetically conductive through additives or through integrated shaped bodies, and which is in contact with coating of said carrier board (9) outside of a ring portion (21).

22. The angle sensor (2) according to claim 1 wherein a non-coated ring portion (21) extends radially outward into a portion of anchor bore holes (17).

23. The angle sensor (2) according to claim 1 wherein said angle sensor (2) further comprises a marker (15) for a center of the sensor on an upper side (3a) of said encasement body (3) provided in the form of an indentation or of a protrusion.

24. The angle sensor (2) according to claim 11 including sensor shielding having a high permeability $\mu > 50{,}000$.

25. The angle sensor (2) according to claim 24 wherein said sensor shielding is disposed very close to a sensor element (4), and material of said shielding has a coercive field strength $Hc < 5$ A/cm.

26. The angle sensor (2) according to claim 24 wherein said sensor shielding is selected from the group consisting of: plastic bound ferrite, hard ferrite and nano-crystalline iron.

27. The angle sensor according to claim 24 wherein said sensor shielding is comprised of several layers, of which at least one layer has a particularly high permeability and at least another layer has a particularly low hysteresis.

28. The angle sensor (2) according to claim 1 wherein said angle sensor (2) is configured flat and plate-shaped, and a sensor element is disposed in parallel to a main plane of a plate-shaped angle sensor (2), on a front side of a circuit board, disposed in parallel to the main plane, wherein said front side faces a front face (2a).

29. The angle sensor (2) according to claim 1 wherein said circuit board carries processing electronics for signals of said sensor element, also a transmitter for wireless transmission of the sensor signals.

30. The angle sensor (2) according to claim 29 wherein said processing electronics are programmable in completely finished state by selection of one from the group consisting of at least one additional electrical conductor in the cable and wirelessly by radio or optical signals.

31. The angle sensor (2) according to claim 1 wherein said encasement body is performed in two layers with a flexible elastomeric encasing the electronic components and with a hard layer enclosing an inner layer.

32. The angle sensor (2) according to claim 1 wherein said encasement body (3) is comprised of transparent material and the circuit comprises light emitting diodes (LEDs) or other optically detectable switchable elements.

33. A method for producing an angle sensor (2) as set forth in claim 1, said method comprising the steps of:
  defined portions of an upper side (9a) of a combined carrier board and circuit board are coated with a solder stop mask protective lacquer;
  pluralities of units are cut out of a plastic board, which are arranged in multiples next to one another and which correspond to a shape of subsequent combined carrier board and circuit board (9/1), and which are still connected amongst one another at small contact spots;
  the plurality of still connected units is subsequently coated in an electrically conductive manner on all sides; and subsequently also coated on all sides in an enveloping manner by a corrosion protection layer;

the particular units are separated from one another at the contact spots, and a cutting surface is created at the separation spot viewed in a board plane (30), wherein the cutting surface does not extend in parallel to a transversal direction (31) of the board plane, but comprises a lug, which protrudes from the unit in a convex manner;

before and after the separation into particular units, anchoring bore holes (17) are imparted at a slant angle to a transversal direction (18), or expanding towards a backside (9*b*) of the carrier board from a backside (9*b*);

the circuit is soldered on or riveted onto an upper side (9*a*) of the combined carrier board and circuit board (9/1);

the circuit is connected in an electrically conducting manner with the supply leads or with the supply cable;

the combined carrier board and circuit board (9/1) is inserted into an encasement mold (3'), and encasement material (3'), which is still flow capable, is injected, and thereby the encasement body (3) is fabricated at the board; and the combined carrier board and circuit board (9/1) creates an electrical circuit and the unit is metal coated outside of a non-coated ring portion (21'), wherein after separating the angle sensors from the plurality of units, each particular angle sensor is provided with an encasement body (3) through encasement, or angle sensors, which are not yet separated from one another, are simultaneously provided with particular encasement bodies through encasement.

* * * * *